United States Patent [19]
Banks

[11] 3,913,326
[45] Oct. 21, 1975

[54] ENERGY CONVERSION SYSTEM

[75] Inventor: Ridgway M. Banks, Orinda, Calif.

[73] Assignee: The United States of America as represented by the United States Energy Research and Development Administration, Washington, D.C.

[22] Filed: Apr. 11, 1974

[21] Appl. No.: 459,991

[52] U.S. Cl. .................................. 60/527; 60/527
[51] Int. Cl.² ....................................... F01B 29/00
[58] Field of Search ............................. 60/527–531

[56] References Cited
UNITED STATES PATENTS

| | | | |
|---|---|---|---|
| 3,403,238 | 9/1968 | Buehler et al. | 60/527 |
| 3,430,441 | 3/1969 | Adams | 60/529 |

Primary Examiner—Martin P. Schwadron
Assistant Examiner—Allen M. Ostrager
Attorney, Agent, or Firm—John A. Horan; F. A. Robertson; Irene S. Croft

[57] ABSTRACT

An engine for converting thermal energy to rotary mechanical work by alternating changes in configuration of thermally responsive elements composed of a thermal memory material. The elements are pivotally interconnected between a stationary pivot and a rotor which rotates about a fixed axis disposed eccentrically of the stationary pivot. Alternate heating and cooling of the thermally responsive elements to temperatures above and below, respectively, the predetermined critical temperature results in a torque about the fixed axis of the rotor.

9 Claims, 4 Drawing Figures

ENERGY CONVERSION SYSTEM

BACKGROUND OF THE INVENTION

The invention disclosed herein was made in the course of, or under, Contract No. W-7405-ENG-48 with the United States Atomic Energy Commission.

The present invention relates to an energy conversion system which effectively utilizes a relatively low heat differential in the conversion of heat energy to mechanical energy.

There is a great deal of recoverable energy, not currently utilized in many parts of the world, in the form of industrial waste heat, geothermal heat, oceanic thermal gradients, and solar radiation. The relatively low concentration of temperature of this heat has been a deterrent to its exploitation because standard recovery techniques generally have not approached competitive efficiency.

Much effort has been expended on about 1 to 10 kW units that can operate on small temperature differences from various heat sources, but there is, as yet, no engine for the effective conversion of heat into mechanical energy at low temperature. To the present time, most efforts have centered on turbine systems which operate on the Rankine cycle and require changing the state of the working fluid, generally an organic fluid having a low boiling point.

Other proposed heat engines utilizing low temperature gradients are based on the Joule-effect, that is, the property of stretched rubber bands to contract when warmed. Several rubber band engines are described in "The Amateur Scientist", *Scientific American*, April 1971, pages 118–122. One such engine resembles a bicycle wheel with spokes of rubber bands. The wheel rotates on a fixed vertical shaft with a crank at its center. The hub of the wheel turns on the crankpin. The eccentric position of the hub causes the rubber to stretch more on one side of the wheel than on the other. A hot plate, located at the point of maximum elongation, warms and contracts the rubber, thereby inducing rotation. The rubber band engines have not been known to be investigated other than in the laboratory. One of the problems involved in these engines is the deterioration of the rubber material. The power and efficiency of the engine can be increased with the elongation of the rubber but then the useful life of the material decreases.

It is among the objects of the present invention to provide a heat engine which can effectively obtain power utilizing a relatively low heat differential.

More specifically, it is an object of this invention to provide an energy conversion system capable of effectively converting heat into rotary mechanical work by utilizing the differential of certain physical characteristics which change during thermal cycling of certain metal alloys.

SUMMARY OF THE INVENTION

The objects of this invention are accomplished by utilizing, as the working element in the energy conversion system of the present invention, a plurality of thermally responsive elements composed of a "memory material", as hereinafter described, which effects a configurational change in said elements during thermal cycling.

Certain metal alloys, sometimes called "memory materials" or "memory metals", are capable of undergoing a martensitic (diffusionless) transition with the ability of the alloys to undergo such a transition being temperature dependent. The temperature range at which this transition can occur is hereinafter called the critical temperature and is characteristic of the particular alloy under consideration. At temperatures below their critical temperatures, these alloys are highly ductile and may be plastically deformed. Annealed at a temperature above its critical temperature in a given shape (hereinafter designated the "heat-treated configuration") and deformed into a "deformed configuration" at a temperature below that critical temperature, such an alloy will revert back to its heat-treated configuration when heated to or above its critical temperature. The alloy will move in a direction opposite to the direction in which it had been deformed and in so doing will exert considerable mechanical force and can produce useful work.

These memory materials have been produced in shapes of wires, rods, foils, plates, tubes, springs, etc., and with wide ranges of temperature responsiveness which is a function of alloy composition and production history. For example, memory materials are available that possess critical temperatures in the range of from −150°C to +150°C. The alloys of one such series, referred to as 55-Nitinol, have chemical compositions in the range from about 53 to about 57 weight percent nickel, balance titanium, and are based on the intermetallic compound NiTi. Descriptions of these and other titanium-based memory materials are given in U.S. Pat. Nos. 3,174,851 (W. J. Buehler et al, "Nickel-Base Alloys", Mar. 23, 1965); 3,403,238 (W. J. Buehler et al, "Conversion of Heat Energy to Mechanical Energy", Sept. 24, 1968); and 3,558,369 (F. E. Wang et al, "Method of Treating Variable Transition Temperature Alloys", Jan. 26, 1971).

The apparatus of the present invention comprises a rotor, preferably a circular rotor such as an annulus or a disk, adapted to rotate about a fixed axis, said rotor defining, distally of the fixed axis, at least one pivot and being adapted to carry said pivot in a circular path about the fixed axis; a stationary pivot disposed proximate the plane of rotation of said rotor and eccentrically of said fixed axis; and at least one thermally responsive element composed of a thermal memory material that changes from a deformed configuration to a heat-treated configuration when subjected to a temperature above a predetermined critical temperature after being initially deformed from the heat-treated configuration to the deformed configuration at a temperature below that critical temperature, said thermally responsive element being prestressed in the flexure mode and disposed such that the outer end thereof is operatively coupled to said pivot and the inner end thereof is operatively coupled to said stationary pivot whereby alternate heating and cooling of the element to a temperature above and below, respectively, the predetermined critical temperatures produces a linear force differential between said pivot and said stationary pivot and a torque about the fixed axis of the rotor. Preferably, the eccentricity of the stationary pivot from the fixed axis is substantially less than the radius of said circular path. In a preferred embodiment of the invention, the rotor comprises at least one annular member with the stationary pivot eccentrically disposed within the periphery thereof.

A particularly suitable thermal memory material for use in the present invention is an alloy of the 55-Nitinol series described above. Such alloys have characteristic critical temperatures from 98°C to −50°C, as the nickel content thereof varies from substantially 53.5 to substantially 56.5 weight percent, as shown in the aforementioned U.S. Pat. No. 3,403,238. It is to be understood that the term "deformed" or "deformed configuration" is used in this application to represent a shape different from the shape in which the memory material was heat-treated or annealed above its critical temperature and thus includes, for example, straightening a piece of twisted material below its critical temperature.

The apparatus of the present invention in powered by thermal means, such as a liquid or gaseous heat transfer medium, whereby the thermally responsive element is subjected to a temperature above the predetermined critical temperature during one half of a revolution and to a temperature below that critical temperature during the other half of the revolution. In the heating phase, the element, initially deformed by flexure at a temperature below the characteristic critical temperature of the memory material employed, attempts to revert back to its heat-treated configuration and in so doing exerts a linear force between said pivot and said stationary pivot. In the cooling phase, the element exerts substantially less force. The net force induces rotation of the rotor. As the rotor rotates, the cooled element, which is now in an easily deformable state, is reset into the deformed configuration as a consequence of the eccentricity of the stationary pivot. The heat energy used to cause the element to revert to its heat-treated configuration is converted to mechanical energy and this mechanical energy far exceeds the amount of mechanical energy used to deform the element. Since the memory materials employed have a fairly critical "triggering" temperature, the temperature differential required to produce useful work is relatively small. The memory material used is preselected to correlate the critical temperature thereof with the temperature of the available heat source.

According to a particular feature of the invention, a plurality of thermally responsive elements are disposed or are supported by means which are disposed substantially radially between the stationary pivot and pivots spaced about the periphery of an annular member. The thermally responsive elements, after being heat-treated in a given configuration, are deformed by flexure at a temperature below the critical temperature of the memory material contained therein in such a manner that reversion from the deformed configuration to the heat-treated configuration effects a change in dimension of each element along a radial axis. For example, one configuration can be elongated while the other is foreshortened, such as a substantially straight band, strip, or wire which can be bent, crimped, or otherwise foreshortened by flexure. The use of a thermal memory material strained in flexure provides for smooth operation of the heat engine during cycling. In addition, flexurally deformed materials are capable of sustained thermal cycling without degradation. From the standpoint of simplicity of fabrication, thermally responsive elements which are substantially straight in one configuration and arcuate or U-shaped in the other configuration are especially suitable for use in the present invention. The use of U-shaped elements makes it possible to use the present heat engine in horizontal disposition with stationary liquid baths.

A specific embodiment of the invention comprises an annular member rotatable about a first fixed shaft; a plurality of support rod members radiating horizontally from and rotatable about a stationary pivot which is also a fixed shaft, with the outer ends of the rod members operatively engaging the annular member in a reciprocating relationship, the rod members and the annular member being substantially coplanar; and a plurality of thermally responsive elements, the heat-treated configuration of which is substantially straight and the deformed configuration of which is arcute, which are suspended by the ends thereof from said rod members, each rod member supporting at least one of said elements. In operation, the inner ends of the thermally responsive elements engage fixed stops or other arresting means on the support rods, while the outer ends of said elements, free to move along the rods, engage the annular member.

Still another embodiment of the invention comprises a plurality of substantially coplanar, annular members of graduated diameter, said members being eccentrically disposed one within the other in a nested attitude, each annular member being rotatable around a separate fixed axis. The annular members are operatively coupled by a gear mechanism for synchronous rotation. A plurality of thermally responsive elements, the heat-treated configuration of which is substantially straight and the deformed configuration of which is arcuate, are disposed in a substantially radial attitude between inner and outer annular members with each thermally responsive element being suspended between adjacent annular members from pivots which are operatively attached to the annular members.

In operation, the U-shaped loops of thermally responsive elements as described in the above specific embodiments, are alternately heated and cooled by alternate passage through a hot water bath and a cold water bath, the temperatures of said baths being maintained above and below, respectively, the characteristic critical temperature of the thermal memory material contained in said elements. In the heating phase, the thermally responsive elements, after being initially deformed in a relatively closed U-shape, attempt to revert back to the substantially straight configuration and become relatively open. The outer ends of said elements move outwardly, pushing against the outer annular member while the inner ends of said elements push against an eccentrically disposed stationary shaft or pivot, thereby producing a torque about the fixed center of rotation of the rotor. In the cooling phase, the thermally responsive elements become more ductile and, as the assembly rotates, are again deformed into the relatively closed U-shape as a consequence of the eccentricity of the stationary pivot.

It has been found that the thermal memory materials as hereinbefore described exhibit the reverse effect, that is, the return to a "remembered" shape at a temperature below the characteristic critical temperature. This reverse effect, which is far less energetic than the change above the threshold, becomes apparent after the heat engine of the present invention has completed several cycles. Thus, during the cooling phase, a linear force is produced between the pivot and the stationary pivot which is opposite in direction from that produced during the heating phase, thereby increasing the effective linear force differential. However, the force exerted by the reverse effect is of relatively minor magnitude.

DETAILED DESCRIPTION OF THE INVENTION

The present invention will be described in detail with reference to the accompanying drawings. It will be understood that the particular embodiments are shown therein by way of illustration only and not as limitations of the invention. The principles and features of this invention may be employed in varied and numerous embodiments without departing from the scope of the invention.

Figure 1:
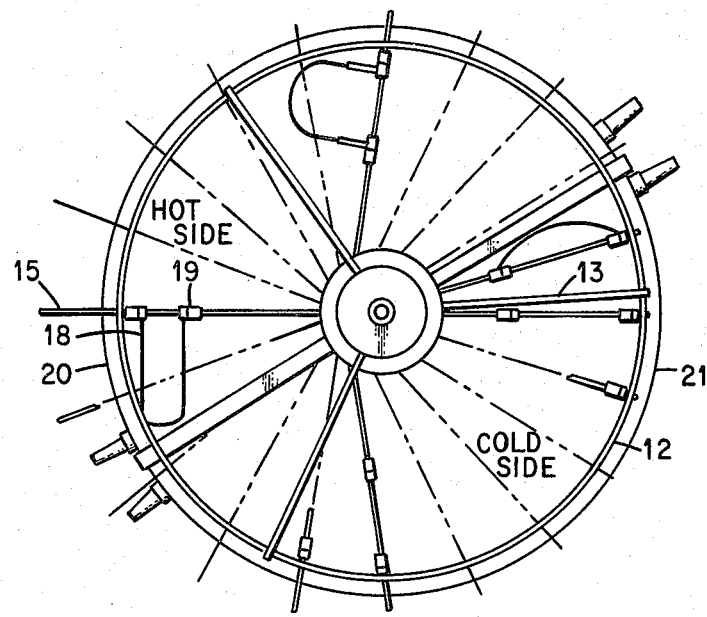
FIGS. 1 and 2 are diagrammatic representations of a plan view and side elevation, respectively, of one particular embodiment of the present invention.
Figure 2:
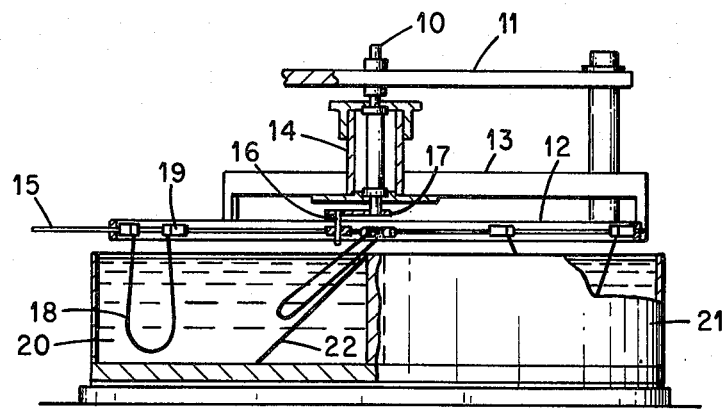

Referring to FIGS. 1 and 2, the numeral 10 refers to a fixed vertical shaft which represents the primary axis of rotation of the assembly. Fixed shaft 10 is supported by suitable support means 11. A ring member 12 is suitably connected, as by ring spider 13, to a rotatable output shaft 14 which rotates about fixed shaft 10. A plurality of rod members, one of which is depicted by numeral 15, radiate horizontally from and rotate about a second fixed shaft 16. The rod members 15 engage ring member 12 in a reciprocating relationship, as by means of apertures diposed about the periphery of the ring. Fixed shaft 10 is coupled to fixed shaft 16 by means of fixed crank 17. A plurality of thermally responsive elements, one of which is depicted by numeral 18, composed of a thermal memory material which has been heat-treated at a temperature above the characteristic critical temperature thereof in a substantially straight configuration, for example, as a straight wire, are bent into U-shaped loops at a temperature below said critical temperature. The thermal memory material is preferably a nickel-titanium alloy of the 55-Nitinol series as hereinabove described. The U-shaped elements 18 are suspended from rod members 15, with each rod member supporting at least one element; the U-shaped elements are free to swing about the rods. The inner ends of elements 18 engage fixed means 19, such as fixed collars, while the outer ends of elements 18 are free to move along the rod members 15 and engage ring member 12.

For operation with a liquid heat transfer medium, there is provided semicircular vessel 20 containing water at a temperature above the critical temperature of the thermal memory material employed and semicircular vessel 21 containing water at a temperature below said critical temperature. The ring-rod-loop assembly is supported in a horizontal position by support 11 in such a manner that the U-shaped thermally responsive elements 18 hang down into the water with half the loops hanging in hot water tank 20 and the other half hanging in cold water tank 21. In operation, the U-shaped elements hanging in the hot water attempt to revert to their substantially straight heat-treated configuration, pushing against the fixed collars 19 on rod members 15 which, in turn, push against the stationary crank 17 thereby driving the ring-rod-loop assembly around fixed shaft 10. The outer ends of U-shaped elements 18 are restrained by ring member 12.

The U-shape elements hanging in the cold water are in a relatively open configuration and are in an easily deformable state. As the assembly rotates, the cooled U-shaped elements are driven to their relatively closed configuration by means of the rod members 15 which are being forced outwardly by the crank. As the U-shaped elements in both the water tanks approach the straight side (the diameter) of their respective vessel, they slide up a ramp, such as ramp 22 shown for the hot water vessel 20, to assume an almost horizontal attitude before swinging over and dropping into the next tank.

Figure 3:
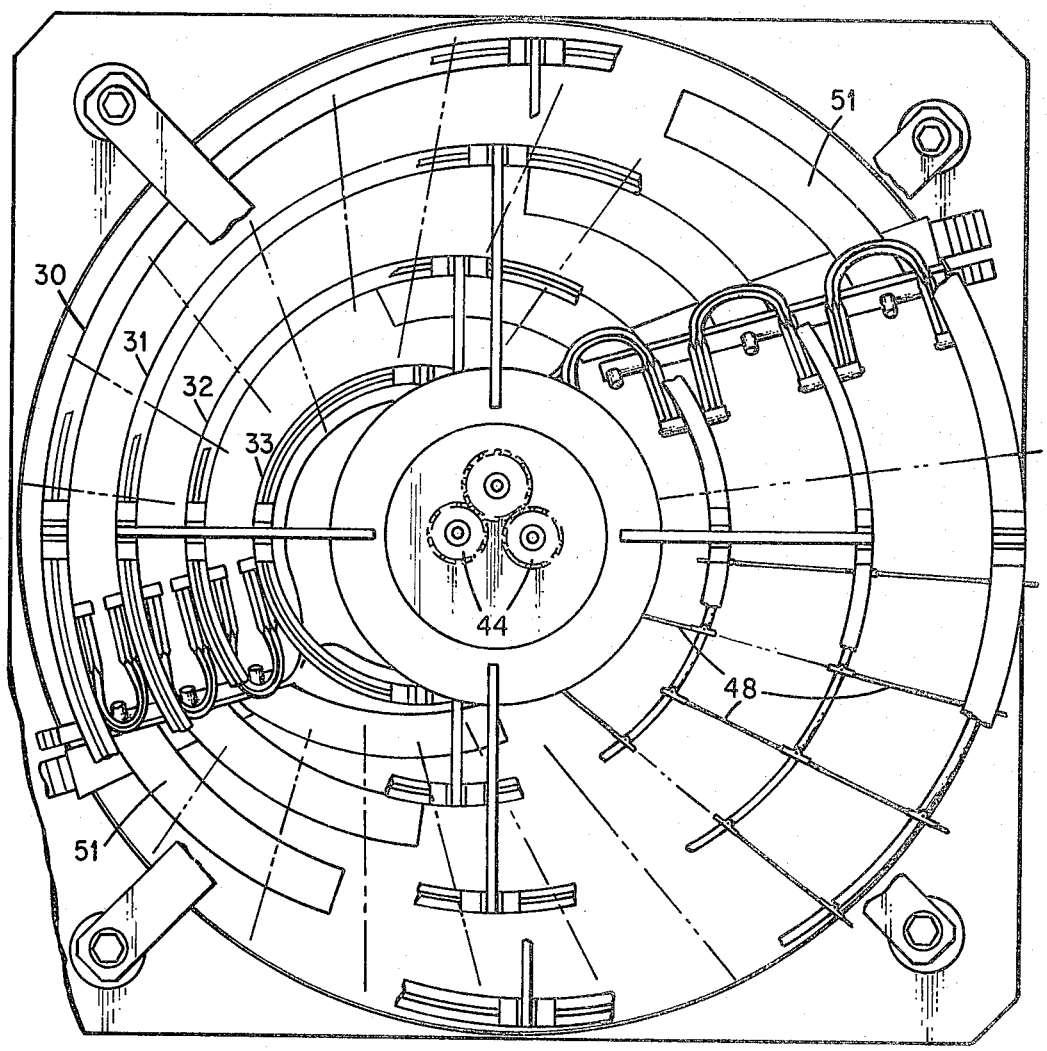
FIGS. 3 and 4 are diagrammatic representations of a plan view and a side elevation, respectively, of another particular embodiment of the present invention.
Figure 4:
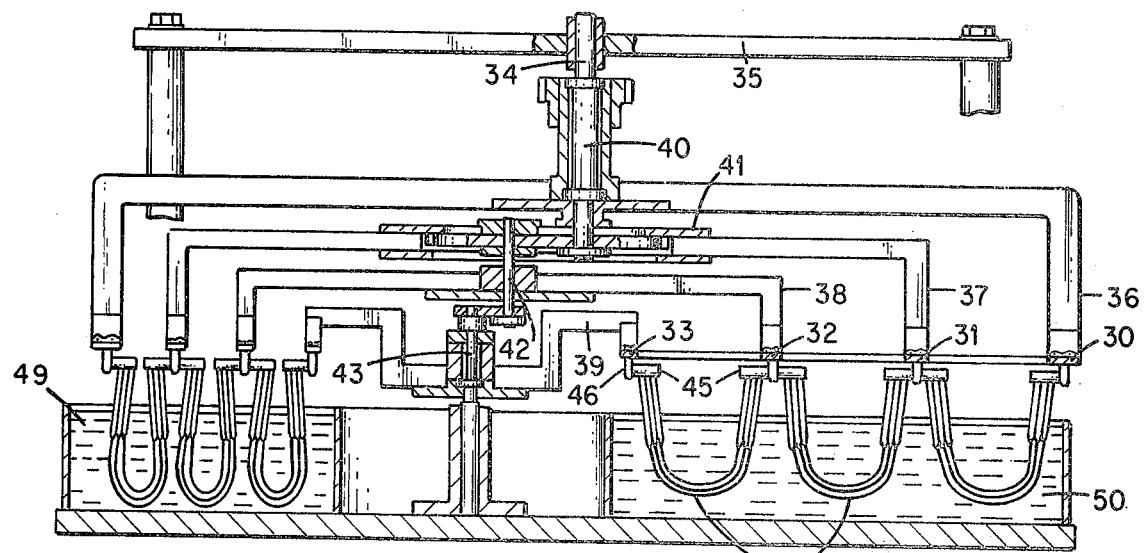

FIGS. 3 and 4 diagrammatically represent another specific embodiment of the present invention. Referring to FIGS. 3 and 4, numerals 30, 31, 32, and 33 designate four substantially coplanar rings of graduated diameter eccentrically disposed in a nested arrangement. Fixed shaft 34 which represents the axis of rotation of the entire assembly is suitably supported by support means 35. The coplanar rings, 30, 31, 32, and 33, are supported by spider-type members 36, 37, 38, and 39, respectively, each of which is connected to rotatable means, such as a rotating shaft or collar, which permits rotation of the rings about their respective fixed axis. Ring spider 36 is connected to rotating output shaft 40. Ring spider 37 is shown connected to rotatable collar 41, while ring spiders 38 and 39 are connected to rotatable shafts 42 and 43, respectively. Suitable gear means 44 operatively couples the four coplanar rings for synchronous rotation. A plurality of pivotable support means, such as trunnions, one pair of which is designated by numeral 45, are attached to rings 30, 31, 32, and 33 by means of stand-offs, one of which is designated by numeral 46, which are aligned in a substantially radial direction. A plurality of thermally responsive elements, a representative set of which is designated by numeral 47, composed of a thermal memory material which has been heat-treated at a temperature above the characteristic critical temperature thereof in a substantially straight configuration, for example, as a straight wire, are bent into U-shaped loops at a temperature below said critical temperature. The thermal memory material is preferably a nickel-titanium alloy of the 55-Nitinol series as hereinbefore described. The U-shaped elements 47 are suspended by trunnions 45 between every two adjacent rings, as shown, the elements being free to swing about said trunnions, with at least one thermally responsive element being supported by each pair of trunnions between the rings. Preferably multiple thermally responsive elements, for example, three, as shown in FIGS. 3 and 4, are suitably connected and suspended on the trunnions between the rings. In order to maintain the thermally responsive elements in substantially linear alignment, coplanar rings 30, 31, 32, and 33 can be suitably interconnected, for example, by a plurality of reciprocating slide wires, an example of which is designated by numeral 48 in FIG. 3.

In one mode of operation with a liquid heat transfer medium, the ring assembly is supported by support means 35 so that half the thermally responsive elements hang in semicircular vessel 49 containing water at a temperature above the characteristic critical temperature of the thermal memory material employed, and the other half hang in semicircular vessel 50 containing water at a temperature below said critical temperature. In operation, the U-shaped elements hanging in the hot water attempt to revert to their substantially straight heat-treated configuration, pushing against the rings between which they are supported. Since the rings are eccentrically disposed, a net force is produced which results in rotation of the entire assembly of rings. The U-shaped elements hanging in the cold water are in a relatively open configuration and are in an easily deformable state. As the assembly rotates, the cooled U-shaped elements are driven to their relatively closed configuration as a result of the eccentricity of the rings. As the U-shaped elements in both the water tanks approach the straight side of their respective vessel, they slide up ramps 51 to assume an almost horizontal attitude before swinging over and dropping into the next tank. To avoid having the thermally responsive elements pull excessive water over the ramps, the ramps can be provided with a plurality of apertures to drain off the water.

A heat engine, constructed in accordance with the particular embodiment described in FIGS. 1 and 2, employed 20 loops of 0.048 inch diameter wire of 55-Nitinol, the heat-treated configuration of which was substantially straight, with each support rod carrying one loop. Approximately 2 inches of the loop was immersed in the water. Using a temperture differential of about 23°C, the engine ran at a speed of 65 rpm with an output of approximately 0.2 watts. After $3 \times 10^6$ cycles, the speed of the engine increased to 69 rpm and the output improved to 0.23 watts. Increasing the temperature differential to about 40°C increased the output to 0.64 watts. The engine was used to generate electricity from solar heated water.

A heat engine, constructed in accordance with the particular embodiment described in FIGS. 3 and 4, employed loops of 55-Nitinol wire of 0.048 inch diameter disposed between four, substantially coplanar rings of graduated diameter. The heat-treated configuration of the 55-Nitinol wire was substantially straight. The wire loops, in sets of three, were suspended from trunnions attached to the rings, with 60 sets of loops being suspended between the innermost ring and the ring adjacent thereto and 120 sets being suspended between each remaining pair of adjacent rings. The power output of the unit was 7.5 watts with a temperature differential of about 20°c.

Although only an arcuate configuration has been shown for the thermally responsive elements, it is to be understood that other suitable configurations, wherein the elements are deformed in the flexure mode, can be used. The use of arcuate elements provides the apparatus of the present invention with the advantage of being operable with stationary liquid baths. For example, the present heat engine can be powered by solar-heated water from a flat-plate collector. Thus, the present system can be extremely useful for driving a residential air conditioning system since the availability of the heat source is guaranteed by the need for use of the equipment.

A unique aspect of the energy conversion system of the present invention is that it works directly in contact with the temperature sources involved and without changes from a liquid to a vapor state. Furthermore, as the thermal memory metals, such as the nickel-titanium alloys, are extremely resistant to corrosion, the present heat engine will be relatively unaffected by contact with sea water, industrial effluent, or geothermal brine, and can be used without intermediary heat exchangers.

Another unique aspect of the present heat engine is that it can operate over a wide range of temperatures and a wide range of difference temperatures by simply selecting a thermal memory material having a suitable critical temperature. By using thermal memory materials which transform at sequentially stepped temperatures it is possible to extract additional heat from the liquid as it passes through a series of cascade of engines. The end limit of such a cascade will occur when the temperature differential between the hot and cold fluids is insufficient to effect a transformation. Waste heat, such as from a furnace flue, may also be utilized.

A principle advantage of the use of thermally responsive elements composed of thermal memory materials over the use of expansible-contractable elements, such as bimetallics or rubber bands, is that, unlike such expansible-contractable elements which work linearly with temperature change and require considerable heat to effect their movement and working potential, thermal memory materials have a fairly critical triggering temperature and thus require minimum heating to do considerable useful work.

Many modifications and variations of the present invention are possible in the light of the above teachings. It is, therefore, not intended to limit the invention except by the terms of the following claims.

What I claimed is:

1. An apparatus for converting heat energy to rotary mechanical work comprising:

a. a rotor adapted to rotate about a fixed axis, said rotor defining, distally of said fixed axis, at least one pivot and being adapted to carry, upon so rotating, said pivot in a circular path about said fixed axis, b. a stationary pivot disposed proximate the principal plane of rotation of said rotor and eccentrically of said fixed axis, c. at least one thermally responsive element composed of a thermal memory material that changes from a deformed configuration to a heat-treated configuration when subjected to a temperature above a predetermined critical temperature after being initially deformed from the heat-treated configuration to the deformed configuration at a temperature below said predetermined critical temperature, said thermally responsive element being prestressed in the flexure mode and being disposed such that the outer end thereof is operatively coupled to said pivot and the inner end thereof is operatively coupled to said stationary pivot whereby alternate heating and cooling of said thermally responsive element to temperatures above and below, respectively, said predetermined critical temperature produces a linear force differential between said pivot and said stationary pivot and a torque about the fixed axis of said rotor, and d. means operatively coupling the outer end and the inner end of said thermally responsive element for synchronous rotation.

2. An apparatus according to claim 1 wherein said thermal memory material is a nickel-titanium alloy containing from substantially 53 to substantially 57 weight percent nickel and the remainder titanium.

3. An apparatus according to claim 1 wherein the eccentricity of said stationary pivot from said fixed axis is substantially less than the radius of said circular path.

4. An apparatus according to claim 3 wherein said rotor is a circular member defining a plurality of pivots spaced about the periphery thereof and further defined by having at least one thermally responsive element operatively coupling each of said pivots with said stationary pivot.

5. An apparatus according to claim 4 wherein said circular member is an annular member and wherein said means for synchronous rotation comprise a plurality of rod members radially disposed from and rotatable about said stationary pivot, the outer end of each of said rod members engaging said annular member in reciprocating relationship therewith, said rod members and said annular member being substantially coplanar, and said thermally responsive elements being disposed such that at least one of said elements is operatively attached to each of said rod members.

6. An apparatus according to claim 5 wherein each of said thermally responsive elements is arcuate in the deformed configuration and substantially straight in the heat-treated configuration and is suspended by the ends thereof from said rod members and wherein said apparatus is adapted to be supported in a horizontal position such that said thermally responsive elements are suspendible in heating and cooling baths.

7. An apparatus for converting heat energy to rotary mechanical work comprising:
   a. a plurality of substantially coplanar, annular members of graduated diameter, said annular members being eccentrically disposed in a nested attitude, each of said annular members being adapted to rotate about a fixed axis and having spaced about the periphery thereof a plurality of pivots, said pivots being disposed in a substantially radial attitude between the innermost and the outermost annular members,
   b. means for operatively coupling said annular members for synchronous rotation, and
   c. a plurality of thermally responsive elements composed of a thermal memory material that changes from a deformed configuration to a heat-treated configuration when subjected to a temperature above a predetermined critical temperature after being initially deformed from the heat-treated configuration to the deformed configuration at a temperature below said predetermined critical temperature, said thermally responsive elements being prestressed in the flexure mode and being disposed such that the ends thereof operatively engage pivots on adjacent annular members whereby alternate heating and cooling of said thermally responsive elements to temperatures above and below, respectively, said predetermined critical temperature produces a linear force differential between said pivots and a torque about the center of rotation of the outer annular member.

8. An apparatus according to claim 7 wherein said means operatively coupling said annular members for synchronous rotation comprise gear means.

9. An apparatus according to claim 7 wherein each of said thermally responsive elements is arcuate in the deformed configuration and substantially straight in the heat-treated configuration and is suspended by the ends thereof from said pivots and wherein said apparatus is adapted to be supported in a horizontal position such that said thermally responsive elements are suspendible in heating and cooling baths.

* * * * *